United States Patent
Vernaza

(10) Patent No.: US 10,290,106 B2
(45) Date of Patent: *May 14, 2019

(54) VIDEO MONITORING USING SEMANTIC SEGMENTATION BASED ON GLOBAL OPTIMIZATION

(71) Applicant: NEC Laboratories America, Inc., Princeton, NJ (US)

(72) Inventor: Paul Vernaza, Sunnyvale, CA (US)

(73) Assignee: NEC Corporation, Tokyo (JP)

( * ) Notice: Subject to any disclaimer, the term of this patent is extended or adjusted under 35 U.S.C. 154(b) by 20 days.

This patent is subject to a terminal disclaimer.

(21) Appl. No.: 15/402,680

(22) Filed: Jan. 10, 2017

(65) Prior Publication Data

US 2017/0228617 A1    Aug. 10, 2017

Related U.S. Application Data

(60) Provisional application No. 62/291,076, filed on Feb. 4, 2016.

(51) Int. Cl.
*G06K 9/62* (2006.01)
*G06T 7/11* (2017.01)
*G06N 3/02* (2006.01)

(52) U.S. Cl.
CPC .............. *G06T 7/11* (2017.01); *G06K 9/6269* (2013.01); *G06N 3/02* (2013.01); *G06T 2207/20081* (2013.01); *G06T 2207/20084* (2013.01)

(58) Field of Classification Search
None
See application file for complete search history.

(56) References Cited

U.S. PATENT DOCUMENTS

| | | | |
|---|---|---|---|
| 2006/0159325 A1* | 7/2006 | Zeineh | G06Q 50/24 382/128 |
| 2008/0072182 A1* | 3/2008 | He | G06F 17/504 716/113 |
| 2015/0161522 A1* | 6/2015 | Saon | G06N 3/0454 706/12 |
| 2017/0109584 A1* | 4/2017 | Yao | G06K 9/00718 |

OTHER PUBLICATIONS

Luis Gomez, Luis Alvarez, Luis Mazorra, Alejandro C. Frery, Classification of Complex Wishart Matrices with a Diffusion-Reaction System guided by Stochastic Distances, Jul. 20, 2015.*
Pul Vernaza, Variational reaction-diffusion systems for semantic segmentation, Computer Science, Computer Vision and Pattern Recognition, Apr. 2016, pp. 1-19.

* cited by examiner

*Primary Examiner* — Kevin Ky
(74) *Attorney, Agent, or Firm* — Joseph Kolodka

(57) ABSTRACT

Methods and systems for monitoring a video feed include capturing input data representing a monitored area using one or more cameras to produce an input data set comprising individual images. Initial segmentation scores are determined for each image of the input data set using a neural network, with each image being assigned an initial segmentation score for each of multiple segmentation classes. Final segmentation scores are determined for each image of the input data set by enforcing a smoothness criterion. The input data set is segmented in accordance with the final segmentation scores. It is determined whether an alert condition is met based on segmented data set. An alert is generated if the alert condition is met.

12 Claims, 4 Drawing Sheets

VIDEO MONITORING USING SEMANTIC SEGMENTATION BASED ON GLOBAL OPTIMIZATION

RELATED APPLICATION INFORMATION

This application claims priority to U.S. Application Ser. No. 62/291,076 filed on Feb. 4, 2016, incorporated herein by reference in its entirety.

BACKGROUND

Technical Field

The present invention relates to image segmentation and, more particularly, to modified neural network segmentation that uses a reaction-diffusion process obeying a variational principle (referred to as "variational reaction diffusion").

Description of the Related Art

Semantic segmentation seeks to take incoming data, for example in the form of a graphical image, and divide the data into logical segments. In the case of processing an image, the segmented output may group together pixels that represent, e.g., people, roads, trees, or other distinctive image features.

While different segmentation techniques have been used, existing semantic segmentation is either computationally myopic (e.g., taking into account only a small portion of the image at a time) or are computationally inefficient.

SUMMARY

A method for monitoring a video feed includes capturing input data representing a monitored area using one or more cameras to produce an input data set comprising individual images. Initial segmentation scores are determined for each image of the input data set using a neural network, with each image being assigned an initial segmentation score for each of multiple segmentation classes. Final segmentation scores are determined for each image of the input data set by enforcing a smoothness criterion. The input data set is segmented in accordance with the final segmentation scores. It is determined whether an alert condition is met based on segmented data set. An alert is generated if the alert condition is met.

A system for data segmentation includes one or more cameras configured to produce an input data set comprising individual images. A neural network is configured to determine initial segmentation scores for each image of an input data set, with each image being assigned an initial segmentation score for each of a plurality of segmentation classes. A segmentation module is configured to determine final segmentation scores for each image of the input data set by enforcing a smoothness criterion and to segment the input data set in accordance with the final segmentation scores. An alert module configured to determine if an alert condition is met based on the segmented input data set and to generate an alert if the alert condition is met.

BRIEF DESCRIPTION OF DRAWINGS

The disclosure will provide details in the following description of preferred embodiments with reference to the following figures wherein.

DETAILED DESCRIPTION OF PREFERRED EMBODIMENTS

Embodiments of the present invention provide image segmentation that makes use of a convolutional neural network (CNN) to identify image features and further uses variational reaction diffusion (VRD) to ensure smoothness in the segmentation output. VRD is used during CNN training as well to produce backpropagation derivatives that may be used to adjust weights in the CNN. The VRD processes described herein provide exact inference and loss derivatives in N log N time in the number of pixels.

Inference in VRD may be interpreted as evolving evidence (or class scores) under the dynamics of a reaction-diffusion process. Evidence for one semantic class may be modeled as a unary potential that propagates across the image via diffusion and reacts with evidence of other semantic classes. Each of these processes may locally create or suppress evidence for each class. By restricting the model to the class of processes that generates solutions to convex, variational problems, a stable equilibrium can be ensured.

Figure 1:
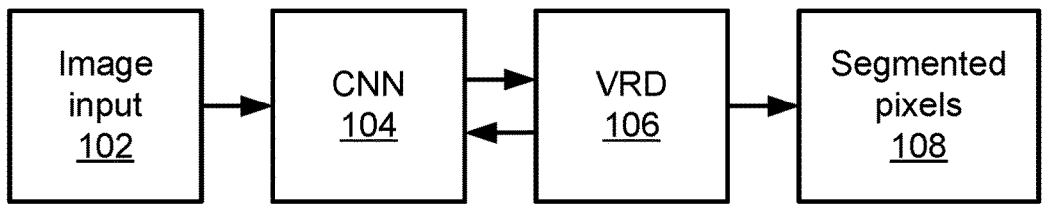
FIG. 1 is a block/flow diagram of a method/system for data segmentation in accordance with the present principles.

Referring now in detail to the figures in which like numerals represent the same or similar elements and initially to FIG. 1, a semantic segmentation procedure is illustratively depicted in accordance with one embodiment of the present principles. An input image 102 is provided, being formed from a two-dimensional array of pixels. It should be understood that the present principles are not limited to graphical information, but may instead be applied to any type of information that has segmentable features. The input image 102 is used by CNN 104 to generate a set of feature outputs. Each pixel in the input image 102 may correspond to a single input of the CNN, with the number of per-pixel outputs of the CNN 104 corresponding to a number of different segmentation fields selected for the image input 102.

For each pixel of the input image 102, the CNN 104 generates an output vector that includes numerical values for the pixel along each of a set of different segmentation fields. It should be understood that the segmentation fields do not necessarily correspond to intuitive features of the image input 102, but are instead the result of the CNN's training process, representing automatically generated features that provide meaningful segmentation of the image.

The output vectors are used by a VRD module 106 to guarantee a smoothness criterion in the image. In one example, smoothness may refer to a tendency for pixels in a particular segment of an image input 102 to be located adjacent to, or at least near to, one another. During training, the VRD module 106 also provides error information back to the CNN 104 based on an error signal. Both the VRD module 106 and the CNN 104 adjust internal parameters in response to the error signal to improve future operation. The VRD 106 outputs a set of vectors for each pixel that represent segmentation scores, with a best score for each pixel representing the segment associated with that pixel.

As noted above, the image input may be represented as $I \subset \mathbb{R}^2$, a rectangular subset of $\mathbb{R}^2$ representing the domain of the image. VRD may be defined as a function that maps a spatially varying set of $N_i$ input features, represented as a function $s^i: I \to \mathbb{R}^{N_i}$, to a set of $N_o$ output scores $s^o: I \to \mathbb{R}^{N_o}$. $N_o$ is interpreted as the number of semantic classes, with $s_k^o(x)$ being a score associated with the $k^{th}$ class at a pixel $x \in I$. A prediction is generated via $$\arg\max_k s_k^o(x).$$

A set of output vectors from the CNN 104 is denoted herein as $s^i$ (forming the input to the VRD 106) and a set of output vectors from the VRD 106 is denoted herein as $s^o$. The two vectors can be combined to a vector $s=(s^{oT}\ s^{iT})^T$, denoting the concatenation of $s^i$ and $s^o$ into a single function $I \to \mathbb{R}^{N_i+N_o}$. The VRD module 106 generates $s^o$ by solving an optimization problem, using $s^i$ as an input. For notational simplicity, the dependence of s on the specific pixel x in the image I is omitted. The optimization problem can be expressed as:

$$\arg\min_{s^o} \int_I s^T Q s + \sum_{d=1}^{2} \frac{\partial s^T}{\partial x_d} B \frac{\partial s}{\partial x_d} dx$$

where d represents the dimensions of the image. The parameters B and Q represent positive-definite parameter matrices that are independent of x. The result is an infinite-dimensional, convex, quadratic optimization problem in $s^o$. The optimization problem can be discretized, with the derivatives being replaced with a finite difference approximation:

$$\frac{\partial s}{\partial x_k} \approx \epsilon^{-1}(s(x') - s(x)),$$

for some $x'$ a small distance $\epsilon$ away from x along the $x_k$ axis.

Intuitively, the term $s^T Q s$ can be interpreted as a unary potential relating $s^i$ and $s^o$ at each point, while $$\frac{\partial s^T}{\partial x_k} B \frac{\partial s}{\partial x_k}$$

represents a binary potential discouraging spatial changes in the score vector.

The calculus of variations may be used to express the solution to the above optimization problem to express its solution as that of the following linear system of partial differential equations:

$$B^o \Delta s^o - Q^o s^o = Q^i s^i - B^i \Delta s^i$$

where $\Delta$ represents the vector Laplacian $((\Delta f)_i := \Sigma_j \partial^2 f_i / \partial x_j^2)$ and where B and Q have been partitioned into sub-matrices $B^o, Q^o, B^i, Q^i$ such that $s^T Q s = s^{oT} Q^o s^o + 2 s^{oT} Q^i s^i + f(s^i)$ and likewise for B. This system can be efficiently solved via a linear change of variables and a backsubstitution exactly analogous to the solution to a finite-dimensional quadratic. Specifically, Schur decomposition is used to write $(B^o)^{-1} Q^o = V U V^T$, where V is orthonormal and U is upper-triangular. A change of variables $z = V^T s^o$ is performed and a new parameter is defined as $s^p := Q^i s^i - B^i \Delta s^i$. A solution for z is found using backsubstitution, first solving the following scalar partial differential equation for $z_{N_o}$, fixing $z_{N_o}$, solving for $Z_{N_o-1}$, and proceeding backwards to $z_1$:

$$\Delta z_k - U_{kk} z_k = (V^T (B^o)^{-1} s^p)_k + \sum_{j=k+1}^{N_o} U_{kj} z_j$$

where k represents a particular semantic class.

After solving for z, the output scores are obtained via $s^o = Vz$. The scalar partial differential equations above may be discretized and solved either via fast Fourier transform or by the multigrid method, the complexity of which scales only as N log N in the number of pixels.

Assuming unit distance between adjacent pixels, discretization yields the following finite system of linear equations $\forall x \in I \cap \mathbb{Z}^2$, where f denotes the right-hand side of the above equation:

$$f(x) = -(U_{kk} + 4) z_k(x) + \sum_{\|\delta\|_1 = 1, \delta \in \mathbb{Z}^2} z_k(x + \delta)$$

Assuming zero boundary conditions, this system can be solved by a discrete sine transform. Because the above expression can be written as a convolution of $z_k$ with some filter F, $z_k$ can be computed as the inverse discrete sine transform of the discrete sine transform of f divided by the discrete sine transform of F.

Once a solution for z is found, the V matrix can be inverted to express the output in terms of $s^o$, which forms the output of the VRD module 106. This output, which provides for each pixel x in the image I a set of values corresponding to each of the k segmentation classes, is used to determine the output segmentation class according to the best score in $s^o$.

Figure 2:
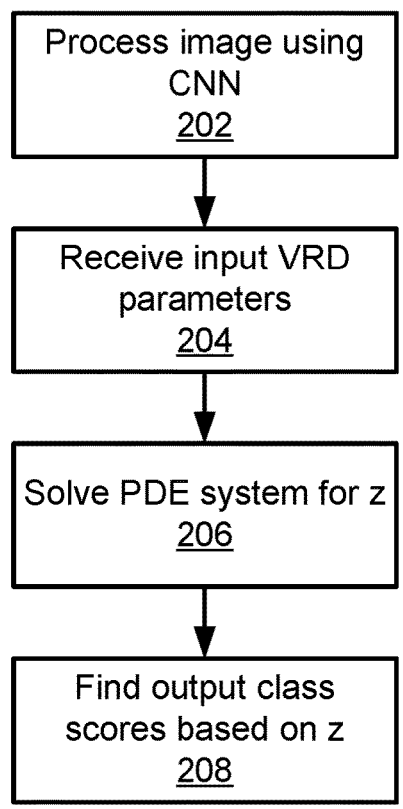
FIG. 2 is a block/flow diagram of a method for data segmentation in accordance with the present principles.

Referring now to FIG. 2, a segmentation method is shown. Block 202 processes an input dataset (e.g., an image) using CNN 104, producing the feature scores $s^i$. At block 204, the VRD module 106 receives input VRD parameters (e.g., B and Q matrices as described above, processed with Schur decomposition to form the V and U matrices).

Block 206 transforms the CNN output vector $s^i$ to form an intermediate set of scores $s^p$ via a linear transformation. Block 206 then uses the VRD parameters and $s^p$ to solve the partial differential equations described above for z. As described above, the calculus of variations is used to reduce the optimization problem to such a set of equations. The Schur decomposition provides a change in variables that reduces the system of equations to an upper-triangular form that can be solved as the sequence of scalar-valued partial differential equations (e.g., changing from $B^o$ and $Q^o$ to V and U). Block 206 solves the system of equations for $z^k$ in decreasing order from k=N to k=1. Once $z^k$ is fully solved in this way, block 208 finds output class scores $s^o$ based on z, reversing the linear change in variables, to provide the segment assignment for each pixel in the image.

Figure 3:
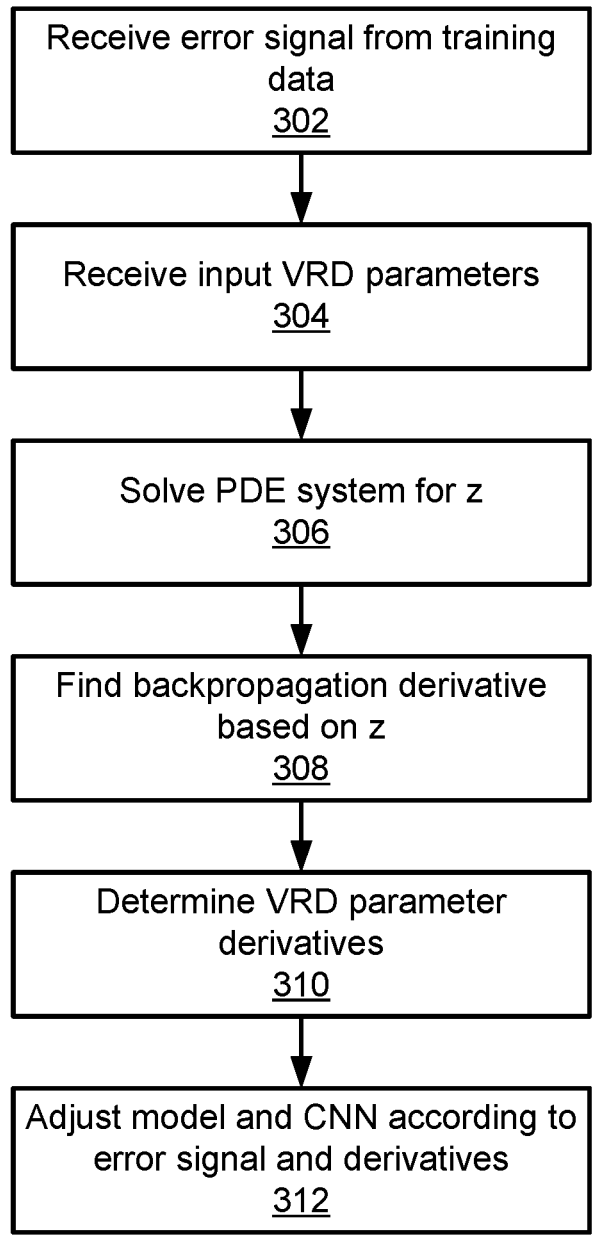
FIG. 3 is a block/flow diagram of a method for model and neural network training in accordance with the present principles.

Referring now to FIG. 3, a method of model learning and CNN training is shown. During learning, an input error signal is generated by comparing an expected segmentation output with $s^o$, with the difference between the two representing the error signal. The error signal is defined as a differentiable loss function $L(s^o)$. Gradient-based learning computes the derivatives of L with respect to the parameter matrices B, Q, and potentially the inputs $s^i$, allowing the model to be used in backpropagation. The backpropagation derivative is $$\frac{dL}{ds^p}: I \to \mathbb{R}^{N_o}$$

and can be solved by solving the same partial differential equation system as in the inference process described above, replacing $s^p$ with $$\frac{dL}{ds^o}.$$

Specifically, the following equation is solved for $$\frac{dL}{ds^o}: B^o \Delta \frac{dL}{ds^p} - Q^o \frac{dL}{ds^p} = \frac{dL}{ds^o}$$

Block 302 receives an error signal from the training data and block 304 receives the input VRD parameters (e.g., the same parameters as are used in block 204 above). Block 306 solves the partial differential equations for z. Block 308 uses the variable change relationship $$\frac{dL}{ds^p} = Vz$$

to produce the output backpropagation derivative and block 310 determines VRD parameter derivatives. The parameter derivatives can be expressed as simple functions of the backpropagation derivative as follows:

$$\frac{dL}{dB^o} = -\int_I \frac{dL}{ds^p} \Delta s^{oT} dx$$

$$\frac{dL}{dQ^o} = -\int_I \frac{dL}{ds^p} s^{oT} dx$$

Block 312 then adjusts the parameters for the VRD module 106 and the CNN 104 according to the error signal, with the respective derivatives providing a degree of parameter change needed for a given error signal.

Embodiments described herein may be entirely hardware, entirely software or including both hardware and software elements. In a preferred embodiment, the present invention is implemented in software, which includes but is not limited to firmware, resident software, microcode, etc.

Embodiments may include a computer program product accessible from a computer-usable or computer-readable medium providing program code for use by or in connection with a computer or any instruction execution system. A computer-usable or computer readable medium may include any apparatus that stores, communicates, propagates, or transports the program for use by or in connection with the instruction execution system, apparatus, or device. The medium can be magnetic, optical, electronic, electromagnetic, infrared, or semiconductor system (or apparatus or device) or a propagation medium. The medium may include a computer-readable storage medium such as a semiconductor or solid state memory, magnetic tape, a removable computer diskette, a random access memory (RAM), a read-only memory (ROM), a rigid magnetic disk and an optical disk, etc.

Each computer program may be tangibly stored in a machine-readable storage media or device (e.g., program memory or magnetic disk) readable by a general or special purpose programmable computer, for configuring and controlling operation of a computer when the storage media or device is read by the computer to perform the procedures described herein. The inventive system may also be considered to be embodied in a computer-readable storage medium, configured with a computer program, where the storage medium so configured causes a computer to operate in a specific and predefined manner to perform the functions described herein.

A data processing system suitable for storing and/or executing program code may include at least one processor coupled directly or indirectly to memory elements through a system bus. The memory elements can include local memory employed during actual execution of the program code, bulk storage, and cache memories which provide temporary storage of at least some program code to reduce the number of times code is retrieved from bulk storage during execution. Input/output or I/O devices (including but not limited to keyboards, displays, pointing devices, etc.) may be coupled to the system either directly or through intervening I/O controllers.

Network adapters may also be coupled to the system to enable the data processing system to become coupled to other data processing systems or remote printers or storage devices through intervening private or public networks. Modems, cable modem and Ethernet cards are just a few of the currently available types of network adapters.

Figure 4:
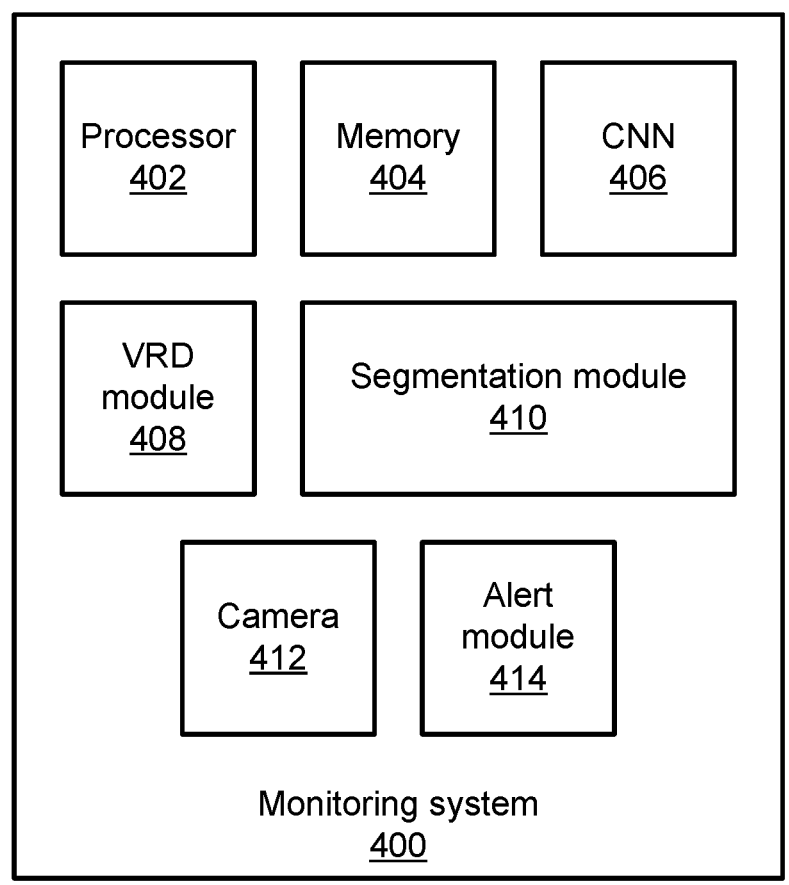
FIG. 4 is a block diagram of a monitoring system in accordance with the present principles.

Referring now to FIG. 4, an exemplary monitoring system 400 is shown that provides one concrete example of image segmentation. In particular, the monitoring system 400 includes a hardware processor 402 and a memory 404. The monitoring system 400 further includes one or more cameras 412 and/or other sensors that may be used to collect information in an environment. The monitoring system 400 further includes one or more functional modules that may, in one embodiment, be implemented as software that is stored in memory 404 and executed by hardware processor 402. In an alternative embodiment, the functional modules may be implemented as one or more discrete hardware components, for example as application specific integrated chips or field programmable gate arrays.

A CNN 406 takes as input an image I that may be captured by the camera 412 and stored in memory 404 or that may be provided by any other source. The CNN 406 assigns, for each pixel in the image, scores that correspond to a set of different segmentation classes that are learned by the CNN 406. A VRD module 408 enforces a smoothness criterion on the scores output by the CNN, providing updated scores for each pixel of the image. A segmentation module 410 then determines which pixels belong to each segmentation class, with each pixel being assigned to a class in accordance with the best score (e.g., highest or lowest score, depending on how the scores are calculated) out of that pixels updated scores.

If the segmentation module 410 indicates the existence in the image of, for example, a particular class or pattern of classes within the input image, an alert module 414 may be configured to provide a monitoring alert to an operator and, optionally, to initiate an automated action such as, e.g., locking doors or increasing a physical security level of a premises. Alternatively, the alert module 414 may trigger on a change in the segmentation scores beyond a predetermined threshold. Any appropriate condition may be implemented to capture, for example, motion or the presence of a particular kind of segmentation pattern within a video feed. A condition may be triggered by, e.g., a score for a given segmentation class exceeding a threshold or if a change in the segmentation scores for one or more of the segmentation classes exceeds a threshold.

Figure 5:
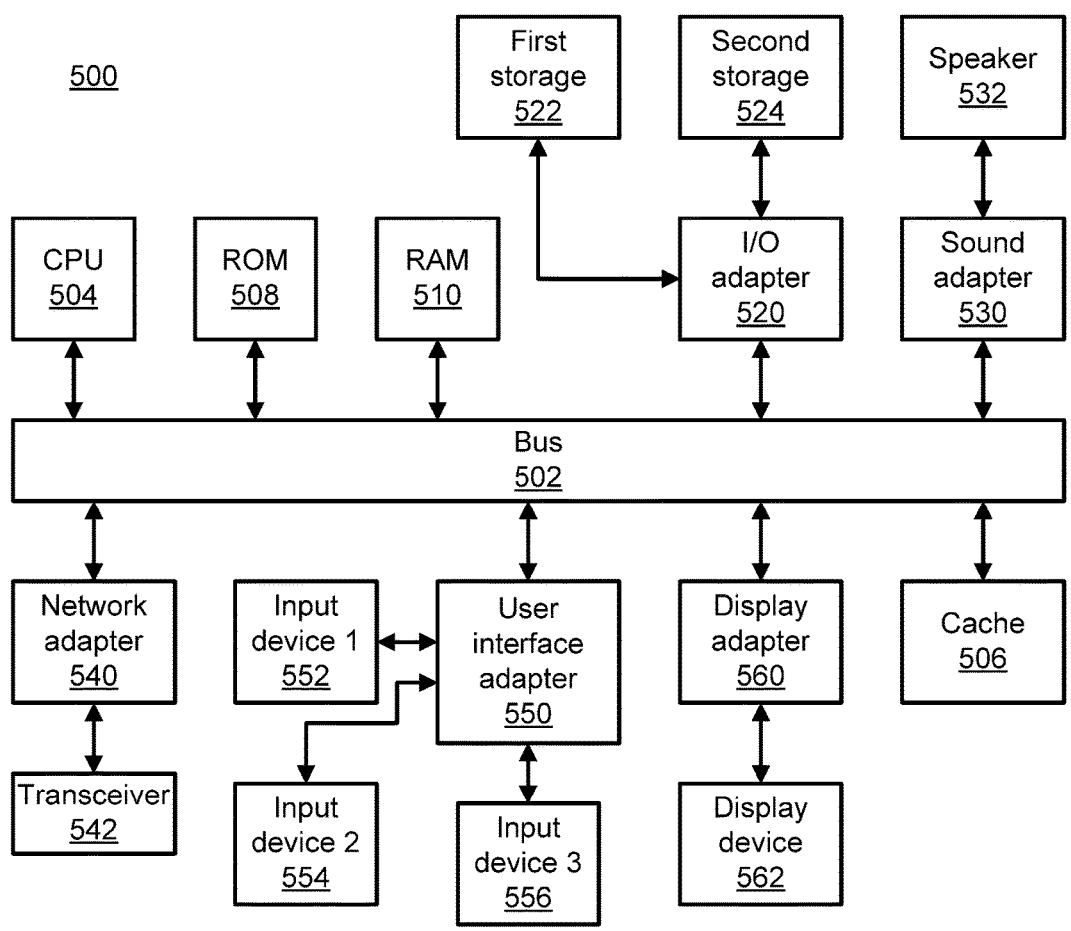
FIG. 5 is a block diagram of a processing system in accordance with the present principles.

Referring now to FIG. 5, an exemplary processing system 500 is shown which may represent the monitoring system 400. The processing system 500 includes at least one processor (CPU) 504 operatively coupled to other components via a system bus 502. A cache 506, a Read Only Memory (ROM) 508, a Random Access Memory (RAM) 510, an input/output (I/O) adapter 520, a sound adapter 530, a network adapter 540, a user interface adapter 550, and a display adapter 560, are operatively coupled to the system bus 502.

A first storage device 522 and a second storage device 524 are operatively coupled to system bus 502 by the I/O adapter 520. The storage devices 522 and 524 can be any of a disk storage device (e.g., a magnetic or optical disk storage device), a solid state magnetic device, and so forth. The storage devices 522 and 524 can be the same type of storage device or different types of storage devices.

A speaker 532 is operatively coupled to system bus 502 by the sound adapter 530. A transceiver 542 is operatively coupled to system bus 502 by network adapter 540. A display device 562 is operatively coupled to system bus 502 by display adapter 560.

A first user input device 552, a second user input device 554, and a third user input device 556 are operatively coupled to system bus 502 by user interface adapter 550. The user input devices 552, 554, and 556 can be any of a keyboard, a mouse, a keypad, an image capture device, a motion sensing device, a microphone, a device incorporating the functionality of at least two of the preceding devices, and so forth. Of course, other types of input devices can also be used, while maintaining the spirit of the present principles. The user input devices 552, 554, and 556 can be the same type of user input device or different types of user input devices. The user input devices 552, 554, and 556 are used to input and output information to and from system 500.

Of course, the processing system 500 may also include other elements (not shown), as readily contemplated by one of skill in the art, as well as omit certain elements. For example, various other input devices and/or output devices can be included in processing system 500, depending upon the particular implementation of the same, as readily understood by one of ordinary skill in the art. For example, various types of wireless and/or wired input and/or output devices can be used. Moreover, additional processors, controllers, memories, and so forth, in various configurations can also be utilized as readily appreciated by one of ordinary skill in the art. These and other variations of the processing system 500 are readily contemplated by one of ordinary skill in the art given the teachings of the present principles provided herein.

The foregoing is to be understood as being in every respect illustrative and exemplary, but not restrictive, and the scope of the invention disclosed herein is not to be determined from the Detailed Description, but rather from the claims as interpreted according to the full breadth permitted by the patent laws. It is to be understood that the embodiments shown and described herein are only illustrative of the principles of the present invention and that those skilled in the art may implement various modifications without departing from the scope and spirit of the invention. Those skilled in the art could implement various other feature combinations without departing from the scope and spirit of the invention. Having thus described aspects of the invention, with the details and particularity required by the patent laws, what is claimed and desired protected by Letters Patent is set forth in the appended claims.

What is claimed is:

1. A method for monitoring a video feed, comprising:
capturing input data representing a monitored area using one or more cameras to produce an input data set comprising individual images;
determining initial segmentation scores for each image of the input data set using a neural network, with each image being assigned an initial segmentation score for each of a plurality of segmentation classes;
determining final segmentation scores for each image of the input data set by enforcing a smoothness criterion;
segmenting the input data set in accordance with the final segmentation scores,
wherein the determining final segmentation scores comprises applying variational reaction diffusion (VRD),
wherein the applying VRD comprises solving an optimization problem based on the initial segmentation scores and on positive-definite parameter matrices, and
wherein the optimization problem is expressed as:

$$\arg\min_{s^o} \int_I s^T Q s + \sum_{k=1}^{2} \frac{\partial s^T}{\partial x_k} B \frac{\partial s}{\partial x_k} dx$$

where $s^o$ is a vector of the final segmentation scores for a unit of data, x is a unit of data in data set I, d is a dimension of the data set I, and s is a vector combining $s^o$ and a vector of the initial segmentation scores for the unit of data; and
backpropagating information for efficiently training the neural network using the final segmentation scores and an error signal, wherein computational complexity for the training is reduced by reducing computations for the training to the same steps for generating the final segmentation scores;
determining if an alert condition is met based on the segmented input data set; and
generating an alert if the alert condition is met.

2. The method of claim 1, wherein solving the optimization problem comprises solving a system of partial differential equations.

3. The method of claim 2, wherein applying VRD comprises converting the optimization problem to the system of partial differential equations using Schur decomposition on the positive-definite parameter matrices.

4. The method of claim 2, wherein the system of partial differential equations is expressed as:

$$\Delta z_k - U_{kk} z_k = \left(V^T (B^o)^{-1} s^p\right)_k + \sum_{j=k+1}^{N_o} U_{kj} z_j$$

where $s^p$ is defined as the expression $Q^i s^i - B^i \Delta s^i$, $Q^i$, $Q^o$, $B^i$, and $B^o$ are sub-matrices of the positive-definite parameter matrices, $\Delta$ is the vector Laplacian operator, $s^i$ is the initial segmentation scores for an image, each $z_k$ represents a transformed score on a $k^{th}$ segmentation class, $N_o$ is a number of segmentation classes, and V and U are transformed versions of the positive-definite parameter matrices after Schur decomposition.

5. The method of claim 1, wherein backpropagating information comprises determining derivatives of the error signal with respect to the positive-definite parameter matrices.

6. The method of claim 1, wherein the alert condition comprises a condition selected from the set of a final segmentation score for a predetermined one of the plurality of segmentation classes exceeding a threshold and a change in the final segmentation scores that exceeds a threshold.

7. A system for data segmentation, comprising:
one or more cameras configured to produce an input data set comprising individual images;
a neural network configured to determine initial segmentation scores for each image of an input data set, with each image being assigned an initial segmentation score for each of a plurality of segmentation classes;
a segmentation module configured to determine final segmentation scores for each image of the input data set by enforcing a smoothness criterion and to segment the input data set in accordance with the final segmentation scores,
wherein the segmentation module is further configured to apply variational reaction diffusion (VRD) to determine the final segmentation scores,
wherein the segmentation module is further configured to solve a VRD optimization problem based on the initial segmentation scores and on positive-definite parameter matrices,
wherein the optimization problem is expressed as:

$$\arg\min_{s^o} \int_I s^T Q s + \sum_{k=1}^{2} \frac{\partial s^T}{\partial x_k} B \frac{\partial s}{\partial x_k} dx$$

where $s^o$ is a vector of the final segmentation scores for a unit of data, x is a unit of data in data set I, d is a dimension of the data set I, and s is a vector combining $s^o$ and a vector of the initial segmentation scores for the unit of data; and
wherein the neural network is further configured to backpropagate information for training the neural network using the final segmentation scores and an error signal, wherein computational complexity for the training is reduced by reducing computations for the training to the same steps for generating the final segmentation scores; and
an alert module configured to determine if an alert condition is met based on the segmented input data set and to generate an alert if the alert condition is met.

8. The system of claim 7, wherein the segmentation module is further configured to solve a system of partial differential equations to solve the optimization problem.

9. The system of claim 8, wherein the segmentation module is further configured to convert the optimization problem to the system of partial differential equations using Schur decomposition on the positive-definite parameter matrices.

10. The system of claim 8, wherein the system of partial differential equations is expressed as:

$$\Delta z_k - U_{kk} z_k = \left(V^T (B^o)^{-1} s^p\right)_k + \sum_{j=k+1}^{N_o} U_{kj} z_j$$

where $s^p$ is defined as the expression $Q^i s^i - B^i \Delta s^i$, $Q^i$, $Q^o$, $B^i$, and $B^o$ are sub-matrices of the positive-definite parameter matrices, $\Delta$ is the vector Laplacian operator, $s^i$ is the initial segmentation scores for a unit of data, each $z_k$ represents a transformed score on a $k^{th}$ segmentation class, $N_o$ is a number of segmentation classes, and V and U are transformed versions of the positive-definite parameter matrices after Schur decomposition.

11. The system of claim 7, wherein the neural network is further configured to determine derivatives of the error signal with respect to the positive-definite parameter matrices.

12. The system of claim 7, wherein the alert condition comprises a condition selected from the set of a final segmentation score for a predetermined one of the plurality of segmentation classes exceeding a threshold and a change in the final segmentation scores that exceeds a threshold.

* * * * *